(12) United States Patent
Kim et al.

(10) Patent No.: US 10,049,323 B1
(45) Date of Patent: Aug. 14, 2018

(54) METHOD AND DEVICE FOR PERFORMING ACTIVATION AND CONVOLUTION OPERATION AT THE SAME TIME AND LEARNING METHOD AND LEARNING DEVICE FOR THE SAME

(71) Applicant: StradVision, Inc., Gyeongsangbuk-do (KR)

(72) Inventors: Yongjoong Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

( * ) Notice: Subject to any disclaimer, the term of this patent is extended or adjusted under 35 U.S.C. 154(b) by 0 days.

(21) Appl. No.: 15/783,367

(22) Filed: Oct. 13, 2017

(51) Int. Cl.
*G06F 15/18* (2006.01)
*G06N 3/08* (2006.01)
*G06F 17/12* (2006.01)
*G06N 3/04* (2006.01)

(52) U.S. Cl.
CPC ............... *G06N 3/08* (2013.01); *G06F 17/12* (2013.01); *G06N 3/04* (2013.01)

(58) Field of Classification Search
CPC ....................................................... G06N 3/084
USPC ...................................................... 706/15, 45
See application file for complete search history.

(56) References Cited

U.S. PATENT DOCUMENTS

| 2017/0083792 A1* | 3/2017 | Rodriguez-Serrano ............... G06N 3/0454 |
| 2017/0337682 A1* | 11/2017 | Liao ....................... G06L 7/0012 |

\* cited by examiner

*Primary Examiner* — David R Vincent
(74) *Attorney, Agent, or Firm* — Husch Blackwell LLP

(57) ABSTRACT

A method of learning parameters of a CNN is provided. The method includes steps of: (a) allowing an input value to be delivered to individual multiple element bias layers; (b) allowing the scale layer connected to a specific element bias layer to multiply a predetermined scale value by an output value of the specific element bias layer; (c) (i) allowing a specific element activation layer connected to the scale layer to apply activation function, and (ii) allowing the other individual element activation layers to apply activation functions to output values of the individual element bias layers; (d) allowing a concatenation layer to concatenate an output value of the specific element activation layer and output values of the other element activation layers; (e) allowing the convolutional layer to apply the convolution operation to the concatenated output; and (f) allowing a loss layer to acquire a loss during a backpropagation process.

16 Claims, 12 Drawing Sheets y=CReLU_CONV(x,w$_1$,w$_2$)
WHERE w$_1$ < 0 and w$_2$ > 0 y=NCReLU_CONV(x,$b_1$,$w_1$, $v_1$,$w_2$, $v_2$,$w_3$)

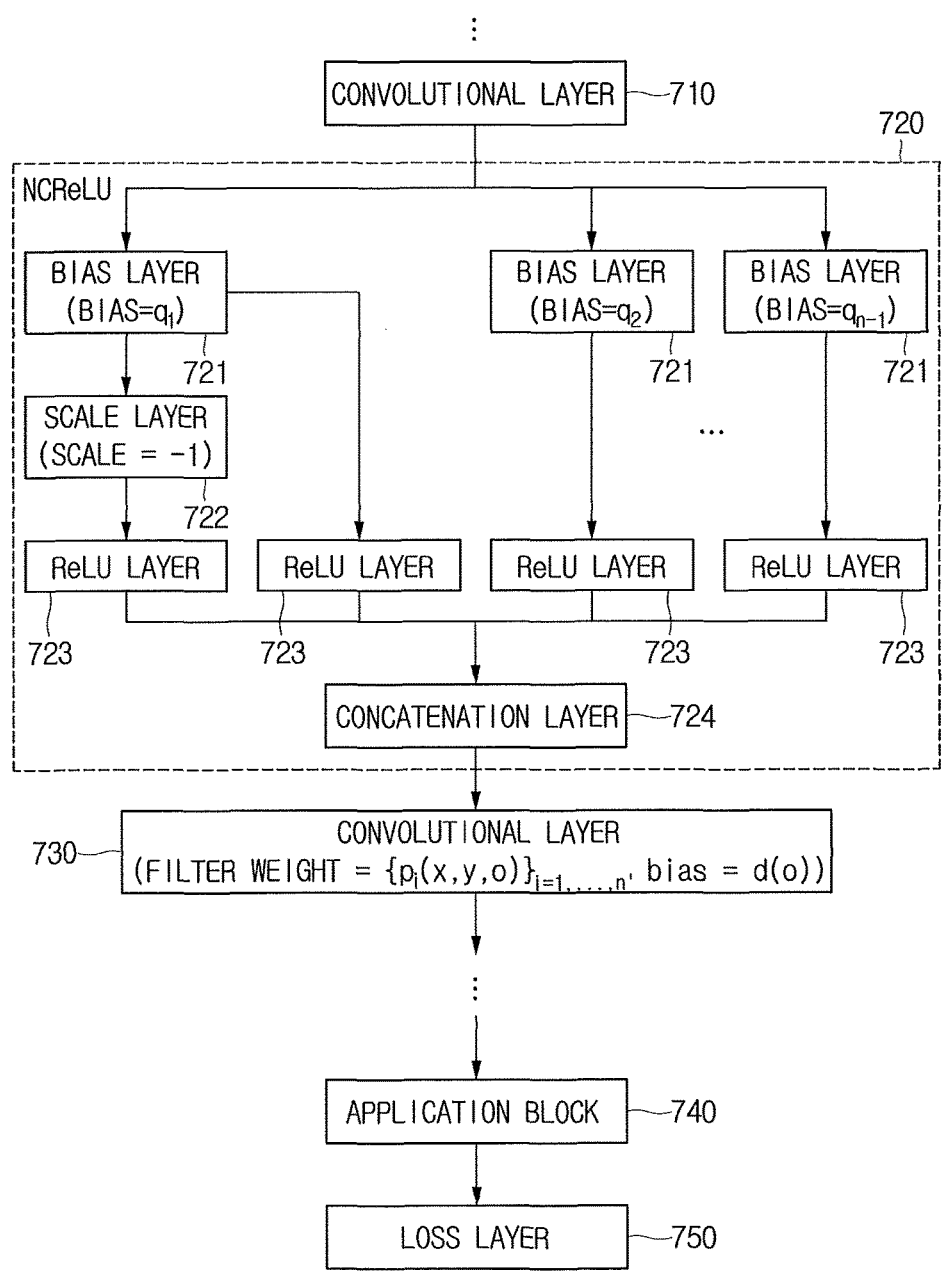

US 10,049,323 B1

METHOD AND DEVICE FOR PERFORMING ACTIVATION AND CONVOLUTION OPERATION AT THE SAME TIME AND LEARNING METHOD AND LEARNING DEVICE FOR THE SAME

FIELD OF THE INVENTION

The present invention relates to a learning method for learning parameters of a convolutional neural network ("CNN") in a learning device in which an activation operation and a convolution operation are performed and the learning device using the same; and more particularly, to a method of learning parameters of the CNN in the learning device in which (i) activation operation of an activation module including multiple element bias layers, a scale layer, and multiple element activation layers and (ii) convolution operation of a convolutional layer are performed, including steps of: (a) the learning device performing a process of allowing an input value corresponding to the input image to be delivered to individual multiple element bias layers and then allowing each of the individual multiple element bias layers to apply its corresponding each element bias parameter qi to the input value; (b) the learning device performing a process of allowing the scale layer connected to a specific element bias layer among the multiple element bias layers to multiply a predetermined scale value by an output value of the specific element bias layer; (c) the learning device performing processes of (i) allowing a specific element activation layer connected to the scale layer to apply a nonlinear activation function to an output value of the scale layer, and (ii) allowing the other individual element activation layers connected to the individual element bias layers to apply individual nonlinear functions to output values of the individual element bias layers; (d) the learning device performing a process of allowing a concatenation layer to concatenate an output value of the specific element activation layer and output values of the other element activation layers, thereby acquiring a concatenated output; (e) the learning device performing a process of allowing the convolutional layer to apply the convolution operation to the concatenated output by using each element weight parameter $p_i$ of the convolutional layer and each element bias parameter d thereof; and (f) the learning device, if the output of the step of (e) is inputted in an application block and then a result value outputted from the application block is acquired, allowing a loss layer to acquire a loss calculated by comparing between the result value outputted from the application block and a value of Ground Truth ("GT") corresponding thereto, thereby adjusting at least some among each element bias parameter $q_i$ of the individual element bias layers, the element weight parameter $p_i$, and the element bias parameter d during a backpropagation process and the learning device using the same.

BACKGROUND OF THE INVENTION

Deep Convolution Neural Networks, or Deep CNN, is the core of the remarkable development in the field of Deep Learning. Though the CNN has been employed to solve character recognition problems in 1990s, it is not until recently that the CNN has become widespread in Machine Learning. Due to the recent researches, the CNN has been a very useful and powerful tool in the field of Machine Learning. For example, in 2012, the CNN significantly outperformed its competitors in an annual software contest, the ImageNet Large Scale Visual Recognition Challenge, and won the contest. After that, the CNN has become a very useful tool in the field of machine learning.

FIG. 1 shows a configuration of a conventional learning device with the CNN capable of performing a CReLU operation and a convolution operation.

By referring to FIG. 1, the conventional learning device has many convolutional layers, e.g., convolutional layers 110 and 130, and many Concatenated Rectified Linear Units (CReLU), e.g., a CReLU 120 and other CReLUs (not illustrated), which are disposed alternately.

Herein, the CReLU 120 may include two Rectified Linear Units (ReLUs) 122 and operations of the ReLUs 122 are performed by following Formulas:

$$\text{ReLU}(x) = \max(0, x) \qquad \text{[Formula 1]}$$

The CReLU is an activation scheme that additionally makes negative activation as well as positive activation of the ReLU just as following Formula.

$$\text{CReLU}(x) = (\text{ReLU}(x), \text{ReLU}(-x)) = (\max(0,x), \max(0,-x)) \qquad \text{[Formula 2]}$$

In comparison of the ReLU, the CReLU may double the number of result values without an increase of computation load of the convolutional layers. Accordingly, the CReLU may increase a detection accuracy while maintaining a detection speed.

In FIG. 1, the CReLU 120 includes one scale layer 121, the two ReLU layers 122, and a concatenation layer 123.

In detail, the scale layer 121 multiplies a value outputted from a previous convolutional layer 110 by a scale value of −1, resulting in a scaled value.

Further, one of the ReLU layers 122 receives the value outputted from the previous convolutional layer 110 and then applies ReLU operation to the received value and the other one of the ReLU layers 122 receives the scaled value from the scale layer 121 and then applies ReLU operation to the scaled value.

By referring to FIG. 1, if $$\begin{pmatrix} 1 & -2 \\ -3 & 4 \end{pmatrix}$$

(i.e., a feature map whose pixel value is 1 at x=0, y=0, and channel ch=0, whose pixel value is 2 at x=1, y=0, and ch=1, whose pixel value is 3 at x=0, y=1, and ch=1, whose pixel value is 4 at x=1, y=1, and ch=0 and whose pixel values are 0 except for the above-mentioned four pixels) as the value outputted from the previous convolutional layer 110 is inputted to the CReLU 120, a first ReLU layer receives $$\begin{pmatrix} 1 & -2 \\ -3 & 4 \end{pmatrix}$$

and a second ReLU layer receives $$\begin{pmatrix} -1 & 2 \\ 3 & -4 \end{pmatrix}$$

and then each of the first ReLU layer and the second ReLU layer performs positive activation operations to thereby generate $$\begin{pmatrix} 1 & 0 \\ 0 & 4 \end{pmatrix}$$

and $$\begin{pmatrix} 0 & 2 \\ 3 & 0 \end{pmatrix},$$

which are then delivered to the concatenation layer 123. Then, the concatenation layer 123 concatenates $$\begin{pmatrix} 1 & 0 \\ 0 & 4 \end{pmatrix}$$

and $$\begin{pmatrix} 0 & 2 \\ 3 & 0 \end{pmatrix}$$

and thus generates $$\left[\begin{pmatrix} 1 & 0 \\ 0 & 4 \end{pmatrix}\begin{pmatrix} 0 & 2 \\ 3 & 0 \end{pmatrix}\right]$$

and then delivers $$\left[\begin{pmatrix} 1 & 0 \\ 0 & 4 \end{pmatrix}\begin{pmatrix} 0 & 2 \\ 3 & 0 \end{pmatrix}\right]$$

to the convolutional layer 130. The convolutional layer 130 performs convolution operations to $$\left[\begin{pmatrix} 1 & 0 \\ 0 & 4 \end{pmatrix}\begin{pmatrix} 0 & 2 \\ 3 & 0 \end{pmatrix}\right].$$

As shown in FIG. 1, if an operation of the CReLU layer and that of the convolutional layer are separately performed, each of independent operations is performed and therefore, the computational load becomes too much.

Accordingly, the inventors of the present invention provide a novel method for reducing the computational load of a CNN where CReLU is used.

SUMMARY OF THE INVENTION

It is an object of the present invention to solve all problems explained above.

It is an object of the present invention to provide a method for increasing a detection accuracy by raising a complexity of a configuration of a CNN without an increase of the computational load of the CNN.

In accordance with one aspect of the present invention, there is provided a method of learning parameters of a CNN in a learning device in which (i) activation operation of an activation module including multiple element bias layers, a scale layer, and multiple element activation layers and (ii) convolution operation of a convolutional layer are performed, including steps of: (a) the learning device performing a process of allowing an input value corresponding to the input image to be delivered to individual multiple element bias layers and then allowing each of the individual multiple element bias layers to apply its corresponding each element bias parameter qi to the input value; (b) the learning device performing a process of allowing the scale layer connected to a specific element bias layer among the multiple element bias layers to multiply a predetermined scale value by an output value of the specific element bias layer; (c) the learning device performing processes of (i) allowing a specific element activation layer connected to the scale layer to apply a nonlinear activation function to an output value of the scale layer, and (ii) allowing the other individual element activation layers connected to the individual element bias layers to apply individual nonlinear functions to output values of the individual element bias layers; (d) the learning device performing a process of allowing a concatenation layer to concatenate an output value of the specific element activation layer and output values of the other element activation layers, thereby acquiring a concatenated output; (e) the learning device performing a process of allowing the convolutional layer to apply the convolution operation to the concatenated output by using each element weight parameter $p_i$ of the convolutional layer and each element bias parameter d thereof; and (f) the learning device, if the output of the step of (e) is inputted in an application block and then a result value outputted from the application block is acquired, allowing a loss layer to acquire a loss calculated by comparing between the result value outputted from the application block and a value of GT corresponding thereto, thereby adjusting at least some among each element bias parameter $q_i$ of the individual element bias layers, the element weight parameter $p_i$, and the element bias parameter d during a backpropagation process.

In accordance with another aspect of the present invention, there is provided a method of learning parameters of a CNN in a learning device in which (i) activation operation of an activation module including multiple element bias layers, a scale layer, and multiple element activation layers and (ii) convolution operation of a convolutional layer are performed, including steps of: (a) the learning device performing a process of allowing an input value corresponding to the input image to be delivered to individual multiple element bias layers and then allowing each of the individual multiple element bias layers to apply its corresponding each element bias parameter qi to the input value; (b) the learning device performing a process of allowing the scale layer connected to a specific element bias layer among the multiple element bias layers to multiply a predetermined scale value by an output value of the specific element bias layer; (c) the learning device performing a process of allowing a concatenation layer connected to the scale layer and the individual element bias layers to concatenate an output value of the scale layer and output values of the individual element bias layers, thereby acquiring a concatenated output; (d) the learning device performing a process of allowing an activation layer connected to the concatenation layer to apply a nonlinear activation function to the concatenated output; (e) the learning device performing a process of allowing the convolutional layer to apply the convolution operation to the output value of the activation layer by using each element weight parameter $p_i$ of the convolutional layer and each element bias parameter d thereof; and (f) the learning device, if the output of the step of (e) is inputted in an application block and then a result value outputted from the application block is acquired, allowing a loss layer to acquire a loss calculated by comparing between the result value outputted from the application block and a value of GT corresponding thereto, thereby adjusting at least some among each element bias parameter qi of the individual element bias layers, and the element weight parameter $p_i$, and the element bias parameter d during a backpropagation process.

In accordance with still another aspect of the present invention, there is provided a learning device for learning parameters of a CNN in which (i) activation operation of an activation module including multiple element bias layers, a scale layer, and multiple element activation layers and (ii) convolution operation of a convolutional layer are performed, including: a communication part for receiving an input image; and a processor for performing (i) a process of allowing an input value corresponding to the input image to be delivered to individual multiple element bias layers and then allowing each of the individual multiple element bias layers to apply its corresponding each element bias parameter qi to the input value, (ii) a process of allowing the scale layer connected to a specific element bias layer among the multiple element bias layers to multiply a predetermined scale value by an output value of the specific element bias layer, (iii) processes of (iii-1) allowing a specific element activation layer connected to the scale layer to apply a nonlinear activation function to an output value of the scale layer, and (iii-2) allowing the other individual element activation layers connected to the individual element bias layers to apply individual nonlinear functions to output values of the individual element bias layers, (iv) a process of allowing a concatenation layer to concatenate an output value of the specific element activation layer and output values of the other element activation layers, thereby acquiring a concatenated output, (v) a process of allowing the convolutional layer to apply the convolution operation to the concatenated output by using each element weight parameter $p_i$ of the convolutional layer and each element bias parameter d thereof, and (vi) a process of allowing, if the output of the process of (v) is inputted in an application block and then a result value outputted from the application block is acquired, a loss layer to acquire a loss calculated by comparing between the result value outputted from the application block and a value of GT corresponding thereto, thereby adjusting at least some among each element bias parameter $q_i$ of the individual element bias layers, the element weight parameter $p_i$, and the element bias parameter d during a backpropagation process.

In accordance with still yet another aspect of the present invention, there is provided a learning device for learning parameters of a CNN in which (i) activation operation of an activation module including multiple element bias layers, a scale layer, and multiple element activation layers and (ii) convolution operation of a convolutional layer are performed, including: a communication part for receiving an input image; and a processor for performing (i) a process of allowing an input value corresponding to the input image to be delivered to individual multiple element bias layers and then allowing each of the individual multiple element bias layers to apply its corresponding each element bias parameter qi to the input value, (ii) a process of allowing the scale layer connected to a specific element bias layer among the multiple element bias layers to multiply a predetermined scale value by an output value of the specific element bias layer, (iii) a process of allowing a concatenation layer connected to the scale layer and the individual element bias layers to concatenate an output value of the scale layer and output values of the individual element bias layers, thereby acquiring a concatenated output, (iv) a process of allowing an activation layer connected to the concatenation layer to apply a nonlinear activation function to the concatenated output, (v) a process of allowing the convolutional layer to apply the convolution operation to the output value of the activation layer by using each element weight parameter $p_i$ of the convolutional layer and each element bias parameter d thereof, and (vi) a process of allowing, if the output of the process of (v) is inputted in an application block and then a result value outputted from the application block is acquired, a loss layer to acquire a loss calculated by comparing between the result value outputted from the application block and a value of GT corresponding thereto, thereby adjusting at least some among each element bias parameter qi of the individual element bias layers, and the element weight parameter $p_i$, and the element bias parameter d during a backpropagation process.

BRIEF DESCRIPTION OF THE DRAWINGS

The drawings attached below to explain example embodiments of the present invention are only part of example embodiments of the present invention and other drawings may be obtained based on the drawings without inventive work for those skilled in the art:

FIGS. 4A and 4B illustrate examples of CReLU_Conv operations while

FIG. 7 shows a learning device for implementing NCReLU_Conv operation of FIG. 6 in accordance with still another example embodiment of the present invention.

DETAILED DESCRIPTION OF THE PREFERRED EMBODIMENTS

Figure 1:
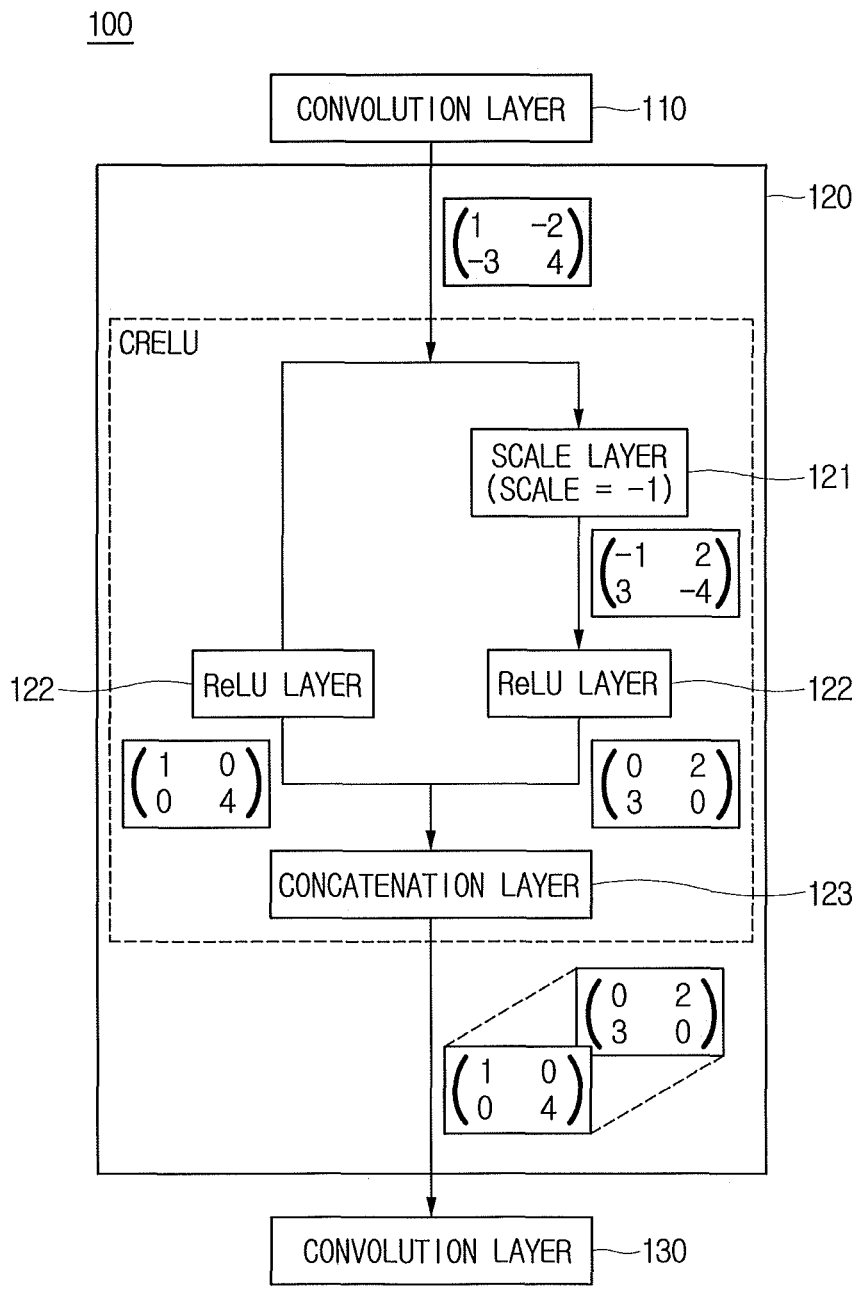
FIG. 1 shows a configuration of a conventional learning device with a CNN capable of performing a CReLU operation and a convolution operation.

Detailed explanations of the present invention explained below refer to attached drawings that illustrate specific embodiment examples of this present that may be executed. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To make those skilled in the art embody the present invention easily, desirable example embodiments of the present invention will be explained more specifically by referring to drawings attached.

Figure 2:
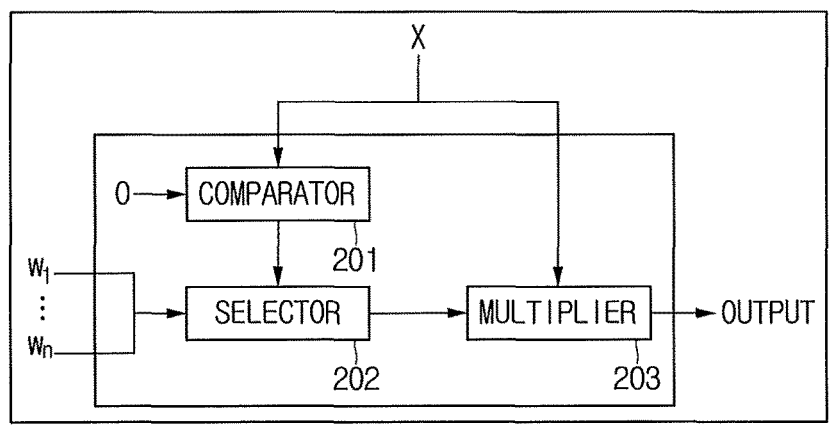
FIG. 2 represents a configuration of a CNN for combining CReLU operation with convolution operation in accordance with one example embodiment of the present invention.

FIG. 2 represents a configuration of a CNN for combining CReLU operation with convolution operation in accordance with one example embodiment of the present invention.

By referring to FIG. 2, an operation unit 200 of the CNN includes a comparator 201, a selector 202, and a multiplier 203. In accordance with the present invention, the operation unit 200 of the CNN may be operated by a computing device (not illustrated) which has a communication part (not illustrated) and a processor (not illustrated).

If a feature map is received from a previous convolutional layer (not illustrated), the processor may allow at least one of the comparator 201, the selector 202, and the multiplier 203 to perform their functions.

By referring to FIG. 1 again, an operation of the CReLU 120 in FIG. 1 generates two outputs by using one input and it may be expressed by Formula 3 as shown below.

$$CReLU(x) = \begin{cases} (0, -x), & x < 0 \\ (x, 0), & x \geq 0 \end{cases} \quad \text{[Formula 3]}$$

As shown in the Formula 3 above, the CReLU has either a non-zero first output or a non-zero second output depending on a scope of an input value.

If the convolutional layer 130 has $$\begin{bmatrix} a \\ b \end{bmatrix}$$

as an element parameter value thereof, an operation of the convolutional layer 130 applied to a result of the operation of the CReLU 120 may be briefly expressed by a Formula 4 as shown below.

$$CReLU(x) * \begin{bmatrix} a \\ b \end{bmatrix} = \begin{cases} a0 + (-b)x, & x < 0 \\ ax + (-b)x, & x \geq 0 \end{cases} = \begin{cases} -bx, & x < 0 \\ ax, & x \geq 0 \end{cases} \quad \text{[Formula 4]}$$

If integration of the CReLU operation and the convolution operation is considered as shown in the Formula 4, a parameter value of the convolutional layer may be determined depending on a scope of an input value of the CReLU, which is shown by a Formula 5 as follows:

$$CReLU\_Conv(x, w_1, w_2) = \begin{cases} w_1 x, & x < 0 \\ w_2 x, & x \geq 0 \end{cases} \quad \text{[Formula 5]}$$

where $w_1 = -b$ and $w_2 = a$ where CReLU_Conv refers to an operation result of applying the convolutional layer to an output of the CReLU; x is an input; the $w_1$ and the $w_2$ are parameters of the convolutional layer; a and b are element parameters of the convolutional layer to be used to acquire the $w_1$ and the $w_2$.

FIG. 2 illustrates the operation unit 200 of the CNN to implement the Formula 5.

If the CReLU operation and then the convolution operation are applied according to a prior art, there are many unnecessary operations such as operations of multiplying outputs of CReLU by 0. However, a novel method in accordance with the present invention integrates the CReLU operation and the convolution operation, by which one of the parameters $w_1$, $w_2$ of the convolutional layer is selected depending on the scope of the input value x of the CReLU.

More specifically, by referring to FIG. 2, if the operation unit 200 of the CNN in accordance with the present invention receives an input image, e.g., a test image, the operation unit 200 allows the comparator 201 therein to compare the input value x corresponding to each of pixel values of the input image with a predetermined reference value and then output a comparison result. The input image is a concept of including not only an image per se inputted to the CNN but also at least one of feature maps received from the previous convolutional layer. The predetermined reference value may be 0 but it is not limited to this.

In addition, the selector 202 outputs a specific parameter selected among the parameters $w_1$, $w_2$ by referring to the comparison result and then delivers it to the multiplier 203.

The multiplier 203 multiplies the input value x by the specific parameter to thereby acquire a multiplication value and then outputs the multiplication value.

For example, as shown in the Formula 5, if the input value x is smaller than 0, the operation unit 200 may multiply the input value by the first parameter $w_1$ which is a minus value of the second element parameter b of the convolutional layer and if the input value x is greater than or equal to 0, the operation unit 200 may multiply the input value by the second parameter $w_2$ which is the first element parameter a of the convolutional layer.

Figure 3A:
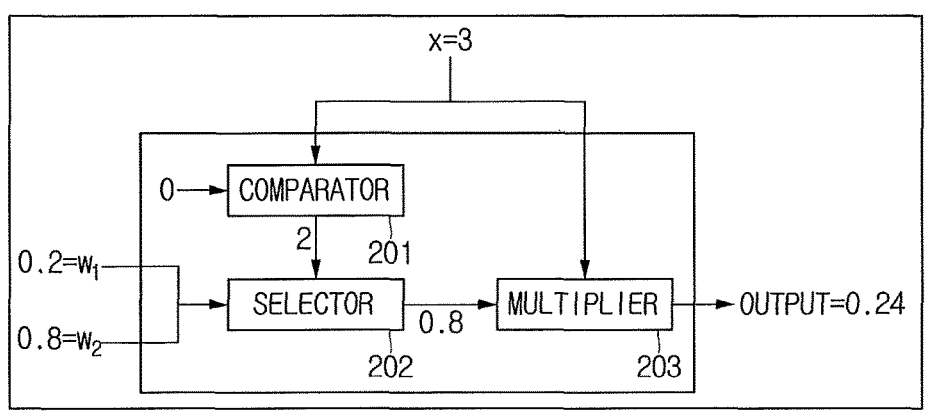
FIGS. 3A and 3B represent examples of FIG. 2.
Figure 3B:
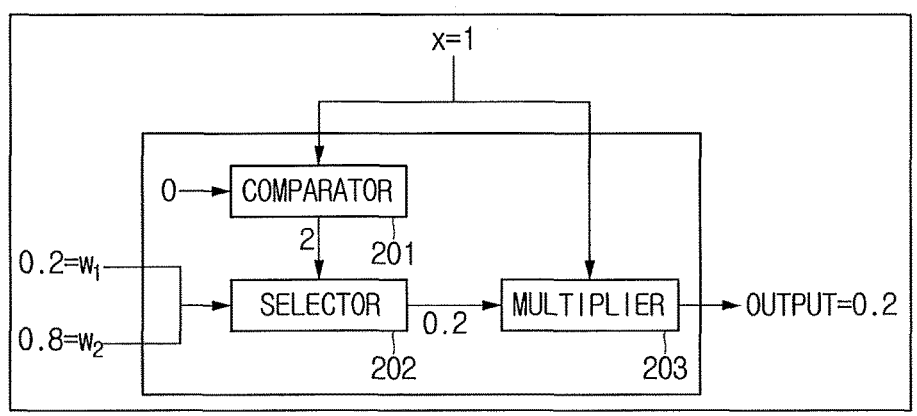

FIGS. 3A and 3B represent examples of FIG. 2.

By referring to FIG. 3A, if the input value x is 3, the comparator 201 outputs 2 as the comparison result, which represents that the input value is greater than the predetermined reference value 0 and the selector 202 selects $w_2$(=0.8), corresponding to the comparison result (=2), among the parameters $w_1$(=0.2) and $w_2$(=0.8), and then outputs it to the multiplier 203. Then, the multiplier 203 outputs 0.24, as the multiplication result, acquired by multiplying the input value x by $w_2$(=0.8).

By referring to FIG. 3B, if the input value x is −1, the comparator 201 outputs 1 as the comparison result, which represents that the input value is smaller than the predetermined reference value 0 and the selector 202 selects w1(=0.2), corresponding to the comparison result(=1), among the parameters w1(=0.2) and w2(=0.8), and then outputs it to the multiplier 203. Then, the multiplier 203 outputs 0.2, as the multiplication result, acquired by multiplying the input value x by $w_1$(=0.2).

Figure 4A:
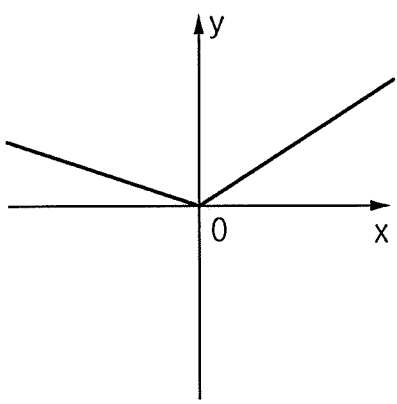
Figure 4B:
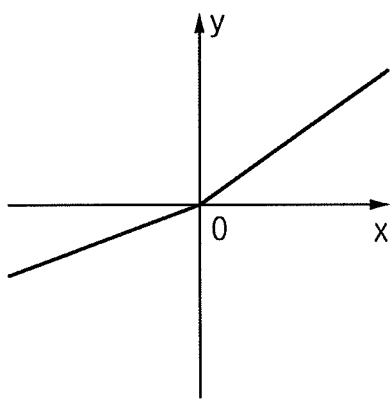
Figure 4C:
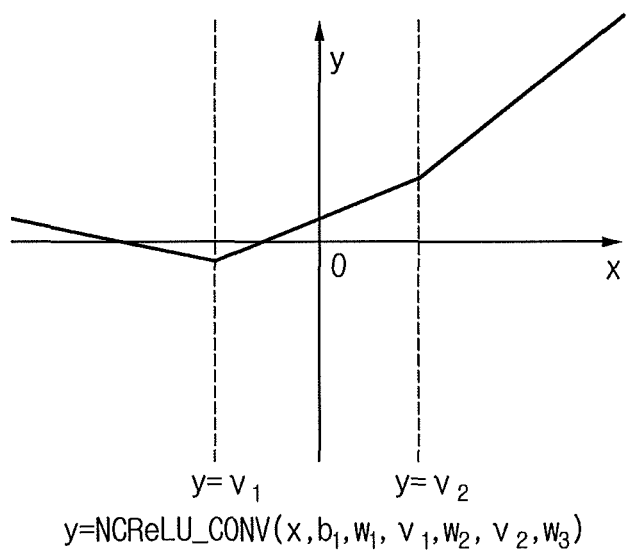
FIG. 4C illustrates an example of NCReLU_Conv operations, where N is 3.

FIGS. 4A and 4B illustrate examples of CReLU_Conv operations while FIG. 4C illustrates an example of NCReLU_Conv operation, where N is 3.

FIGS. 4A and 4B show graphs representing relations between an input x and an output y, i.e., y=CReLU_Conv(x), where the CReLU_Conv represents the integrated operation which combines the CReLU operation and the convolution operation as explained through FIGS. 2, 3A and 3B. The shapes of the graphs of FIGS. 4A and 4B are different depending on signs of values of $w_1$ and $w_2$.

Meanwhile, FIG. 4C is a graph acquired by increasing the number of linear segments to 3 and removing a condition that the graph must pass through (0, 0).

As illustrated in FIG. 4C, the number of linear segments may be increased from 2 to n and reference values to be used for dividing sections could also be increased. Herein, the respective sections include information on respective ranges to be compared with the input value. The comparator in the operation unit may output a comparison result determined by referring to information on which section the input value falls;

The number of linear segments could be increased from 2 as shown in FIGS. 4A and 4B to n(=>3), e.g., three, as shown in FIG. 4C and the number of reference values could be increased from 1 as shown in FIGS. 4A and 4B to n−1, e.g., two, as shown in FIG. 4C. This allows the NCReLU_Conv operation to be implemented in a form of piecewise linear continuous function.

Such NCReLU_Conv may be defined as follows:

$$\text{NCReLU\_Conv}(x, b_1, w_1, v_1, \ldots, w_{n-1}, v_{n-1}, w_n) = \quad \text{[Formula 6]}$$
$$\begin{cases} w_1 x + b_1, & x < v_1 \\ w_2 x + b_2, & v_1 \le x < v_2 \\ \ldots & \ldots \\ w_n x + b_n, & x \ge v_{n-1} \end{cases}$$

where $v_1 < \ldots < v_{n-1}$ and $b_{i+1} = (w_i - w_{i+1})v_i + b_i$ for $i > 1$ where NCReLU_Conv means a result acquired by applying operation of the convolutional layer to the output of N-way CReLU (or NCReLU), i.e., CReLU including N ReLUs; x is the input value; $w_i$ is each of integrated weight parameters of the convolutional layer; $b_i$ is each of adjusted bias parameter of the convolutional layer; and $v_i$ is each of the reference values.

Meanwhile, a condition of bi+1 in the Formula 6 is required to make NCReLU_Conv become a continuous function and the bias parameters except b1 are determined by given values $b_1$, $w_i$, and $v_i$.

Figure 5:
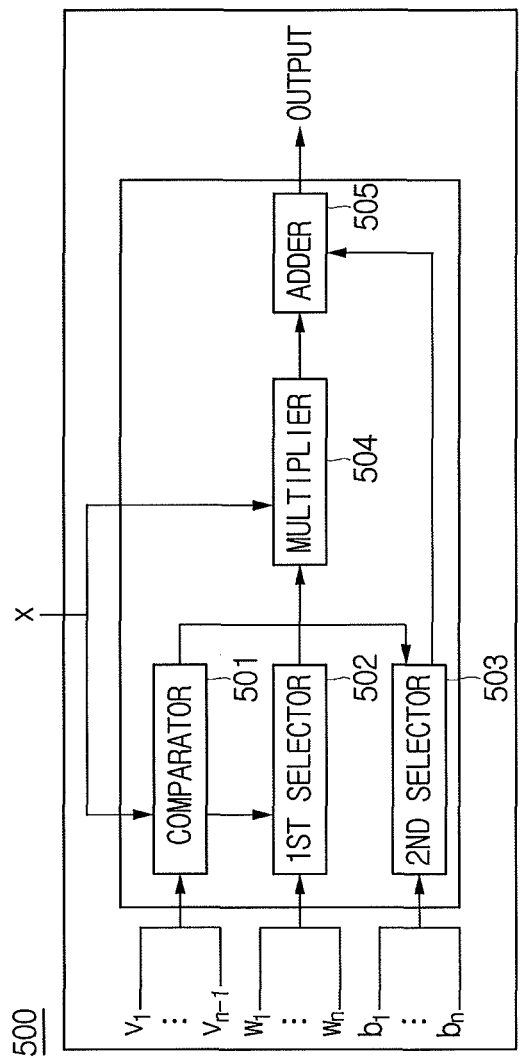
FIG. 5 shows a configuration of a CNN using NCReLU_Conv of a CNN in accordance with another example embodiment of the present invention.

FIG. 5 shows a configuration of a CNN using NCReLU_Conv in accordance with another example embodiment of the present invention.

An operation unit 500 of FIG. 5 which performs NCReLU_Conv operations in accordance with another example embodiment of the present invention is an enhanced version of the operation unit 200 of FIG. 2. The operation unit 200 uses two sections while the operation unit 500 uses n pieces of sections to apply the piecewise linear continuous function.

By referring to FIG. 5, the operation unit 500 capable of performing the NCReLU operation and the convolution operation at the same time may include a comparator 501, a first selector 502, a second selector 503, and a multiplier 504 and an adder 505.

In accordance with the present invention, the operation unit 500 in the CNN may be operated by a computing device (not illustrated) which has a communication part (not illustrated) and a processor (not illustrated).

If a feature map is received from a previous convolutional layer (not illustrated), the processor may allow at least one of the comparator 501, the first selector 502, the second selector 503, and the multiplier 504 and the adder 505 to perform their functions.

More specifically, by referring to FIG. 5, if the operation unit 500 receives an input image, e.g., a test image, the operation unit 500 allows the comparator 501 therein to compare an input value x corresponding to each of pixel values of the input image with predetermined reference values and then output a comparison result. That is, the comparison result is determined by referring to information on which section the input value falls.

For example, in the example illustrated in FIG. 4C, if x is smaller than $v_1$, the comparison result is outputted as 1 and if x is between $v_1$ and $v_2$, the comparison result is outputted as 2 while x is greater than $v_2$, the comparison result is outputted as 3. Herein, the input image is a concept of including not only an image per se inputted to the CNN but also at least one of feature maps received from the previous convolutional layer.

The first selector 502 outputs a specific integrated weight parameter selected among the multiple integrated weight parameters $w_1, \ldots, w_n$ of the convolutional layer by referring to the comparison result and the second selector 503 outputs a specific adjusted bias parameter selected among the multiple adjusted bias parameters $b_1, \ldots, b_n$ of the convolutional layer by referring to the comparison result. Meanwhile, the processor may also perform the processes of the first selector 502 and the second selector 503 at the same time.

The multiplier 504 multiplies the input value x by the specific integrated weight parameter to thereby acquire a multiplication value and then outputs the multiplication value and then the adder 505 adds the specific adjusted bias parameter selected by the second selector 503 to the multiplication value to thereby output a sum value. That is, the sum value may be regarded as a result value acquired by applying the operation of the convolutional layer to an output of the NCReLU.

Meanwhile, each of the integrated weight parameters $w_i$, each of the adjusted bias parameters $b_i$, and the reference values $v_i$ of the Formula 6 are calculated in a Formula 7 as shown below.

$$w_i = \begin{cases} -p_1, & i = 1 \\ -p_1 + \sum_{j=3}^{i+1} p_j, & 1 < i \le \text{rank}(q_1) \\ \sum_{j=2}^{i} p_j, & \text{otherwise} \end{cases} \quad \text{[Formula 7]}$$

$$v_i = -q_{\text{rank}^{-1}(i)}$$
$$b_1 = d - p_1 q_1$$
$$b_{i+1} = (w_i - w_{i+1})v_i + b_i \text{ for } i > 1$$

where $q_i(q_1$ to $q_{n-1})$ is each of element bias parameters of each bias layer; $p_i(p_1$ to $p_n)$ is each of element weight parameters of the convolutional layer; d is an element bias parameter of the convolutional layer; rank(qi) represents information on how large $q_i$ is in $\{q_1, \ldots q_{n-1}\}$; and rank$^{-1}$(i) shows an index of the i-th largest number in $\{q_1, \ldots q_{n-1}\}$.

The N-way CReLU_Conv (or NCReLU_Conv) operation unit illustrated in FIG. 5 may express the piecewise linear continuous function comprised of all n available segments. Further, all enough soft functions are possible to be approximated to the piecewise linear continuous function so that the N-way CReLU_Conv operation unit may be used to learn such soft functions.

Contrarily, CReLU which does not have bias as shown in FIG. 1 consists of only two segments and expresses only a piecewise linear continuous function which satisfy a condition "f(x)=0 when x=0". So does the CReLU_Conv operation unit consisting of only two segments as illustrated in FIG. 2.

If n of the NCReLU_Conv is 2, the operation of the NCReLU_Conv operation unit 500 in FIG. 5 may be expressed as follows and this becomes identical to the operation of the CReLU_Conv operation unit in FIG. 2:

CReLU_Conv(x,-b,a)=NCReLU_Conv(x,-b,0,0,a,0)  [Formula 8]

Figure 6A:
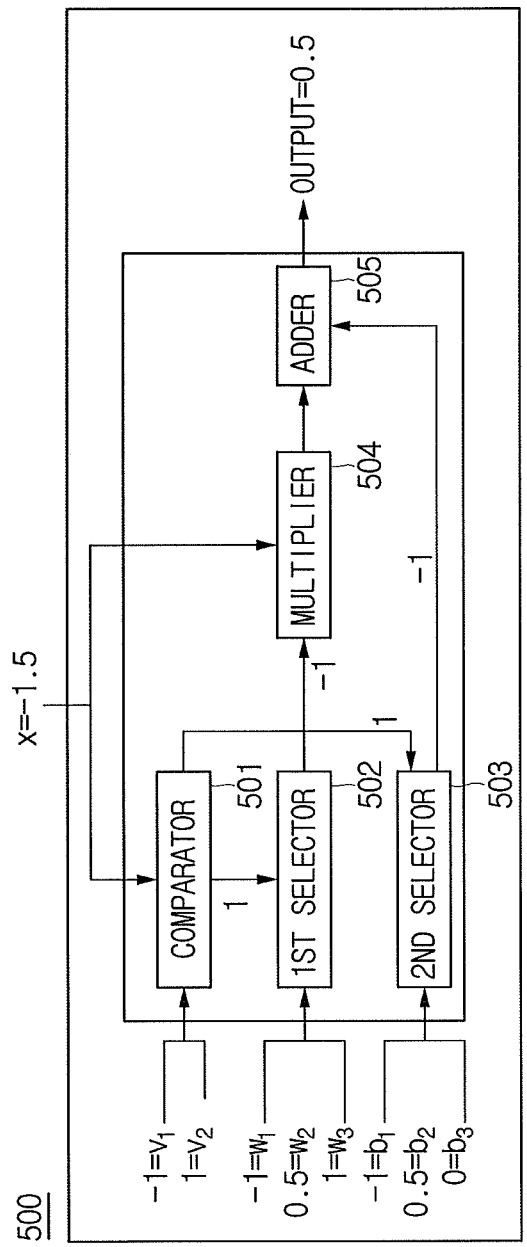
FIGS. 6A and 6B illustrate examples of FIG. 5.
Figure 6B:
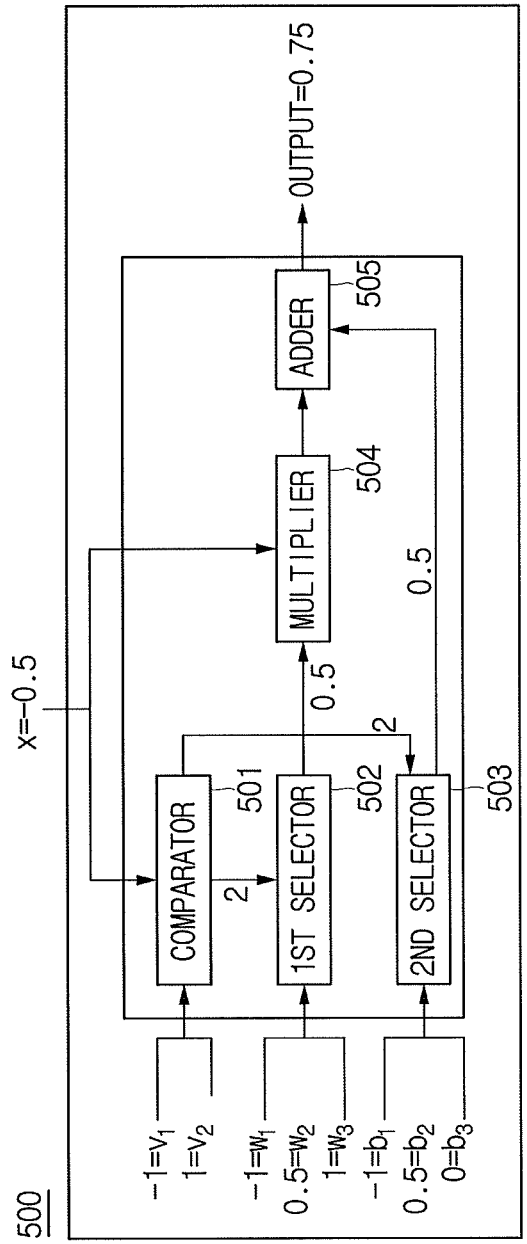

FIGS. 6A and 6B illustrate examples of FIG. 5.

By referring to FIG. 6A, if the input value x is −1.5, the comparator 501 outputs 1 as the comparison result, which represents that the input value is smaller than the first reference value $v_1$ of −1, to thereby deliver the comparison result to the first selector 502 and the second selector 503.

The first selector 502 selects −1 as a specific integrated parameter $w_1$, corresponding to the comparison result, among the three integrated weight parameters $w_1$, $w_2$, and $w_3$ and delivers the specific integrated parameter to the multiplier 504 and the second selector 503 selects −1 as a specific adjusted bias parameter $b_1$, corresponding to the comparison result, among the three adjusted bias parameter $b_1$, $b_2$, and $b_3$ and delivers the specific adjusted bias parameter to the adder 505. Then, the multiplier 504 outputs 1.5 as the multiplication value, acquired by multiplying the input value x by the selected specific integrated parameter $w_1$ and then delivers the multiplication value to the adder 505, which outputs 0.5 as the sum value acquired by adding the specific adjusted bias parameter $b_1$ to the multiplication value.

By referring to FIG. 6B, if the input value x is 0.5, the comparator 501 outputs 2 as the comparison result, which represents that the input value is between the first reference value $v_1$ of −1 and the second reference value $v_2$ of 1, to thereby deliver the comparison result to the first selector 502 and the second selector 503.

The first selector 502 selects 0.5 as a specific integrated parameter $w_2$, corresponding to the comparison result, among the three integrated weight parameters $w_1$, $w_2$, and $w_3$ and delivers the specific integrated parameter to the multiplier 504 and the second selector 503 selects 0.5 as a specific adjusted bias parameter b2, corresponding to the comparison result, among the three adjusted bias parameter $b_1$, $b_2$, and $b_3$ and delivers the specific adjusted bias parameter to the adder 505. Then, the multiplier 504 outputs 0.25 as the multiplication value, acquired by multiplying the input value x by the selected specific integrated parameter $w_2$ and then delivers the multiplication value to the adder 505, which outputs 0.75 as the sum value acquired by adding the specific adjusted bias parameter $b_2$ to the multiplication value.

Meanwhile, to obtain each of the integrated weight parameters $w_i$, each of the adjusted bias parameters $b_i$, and each of the reference values $v_i$, the Formula 7 must be used. Further, in order to use the Formula 7, $q_i(q_1$ to $q_{n-1})$ as each of the element bias parameters of each bias layer, $p_i(p_1$ to $p_n)$ as each of the element weight parameters of the convolutional layer, and d as the element bias parameter of the convolutional layer must be obtained through the learning device.

FIG. 7 shows a learning device for implementing NCReLU_Conv operation of FIG. 6 in accordance with still another example embodiment of the present invention.

Unlike the learning device 100 which uses one CReLU per activation module as illustrated in FIG. 1, a learning device 700 in accordance with the present invention uses NCReLU in one activation module.

The NCReLU has n−1 pieces of bias layers, and when n is increased, the number of pairs of the bias layers and element activation layers, i.e., ReLU layers, is increased. It will be explained later but if the order of element activation layers and a concatenation layer is changed, only the number of bias layers is increased while only one element activation layer is required.

By referring to FIG. 7, the learning device 700 has many convolutional layers, e.g., convolutional layers 710 and 730, and many NCReLU, e.g., an NCReLU 720 and other NCReLUs (not illustrated), which are disposed alternately.

The activation module 720 includes n−1 bias layers 721, each of which has each of the element bias parameters $q_1$ to $q_{n-1}$. More desirably, an order of the element bias parameters $q_2, \ldots, q_{n-1}$ of the second to the (n−1)-th bias layers except the element bias parameter $q_1$ of the first bias layer may be set as $q_2 > \ldots > q_{n-1}$.

Furthermore, the activation module 720 includes one scale layer 722 and n pieces of element activation layers 723, e.g., ReLU layers. The scale layer 722 connected to a specific bias layer, i.e., the first bias layer, among the n−1 pieces of the bias layers 721 performs a process of multiplying an output value of the specific bias layer by a predetermined scale value and then performs a process of transmitting it to a specific element activation layer, i.e., a specific ReLU layer.

Then, the learning device performs processes of (i) allowing the specific element activation layer connected to the scale layer 722 to apply a nonlinear activation function to an output value of the scale layer 722, and (ii) allowing the other individual element activation layers connected to the individual element bias layers 721 to apply individual nonlinear functions to output values of the individual element bias layers 721. The nonlinear activation function is a ReLU operation and the scale value of the scale layer may be −1 but it is not limited to this.

Then, the learning device performs a process of allowing a concatenation layer 724 to concatenate an output value of the specific element activation layer and output values of the other element activation layers, thereby acquiring a concatenated output.

As another example, the order of the element activation layers 723 and the concatenation layer 724 may be changed. If the element activation layers 723 are disposed after the concatenation layer 724, the number of element activation layer 723 may be one.

Again, by referring to FIG. 7, if an output of the activation module 720, i.e., an output of the concatenation layer 724, is delivered to a next convolutional layer 730, the learning device performs a process of allowing the next convolutional layer 730 to apply the convolution operation to the concatenated output by using each element weight parameter pi and each element bias parameter d of the next convolutional layer 730.

After passing through said many convolutional layers, e.g., convolutional layers 710 and 730, and said many NCReLU, e.g., the NCReLU 720 and other NCReLUs (not illustrated), which are disposed alternately, an acquired output may be inputted to an application block 740 and then a result value, e.g., a label image, outputted from the application block is acquired.

Then, the learning device allows a loss layer 750 to acquire a loss calculated by comparing between the result value outputted from the application block and a value of GT corresponding thereto, thereby adjusting at least some among each element bias parameter $q_i$ of the individual element bias layers, the element weight parameter $p_j$, and the element bias parameter d during a backpropagation process.

If the learning has been completed through the learning device 700 having the NCReLU as shown in FIG. 7, respective optimal values of (i) the element bias parameters $q_1, \ldots, q_{n-1}$ of the n−1 pieces of the bias layers, (ii) the element weight parameters $p_j, \ldots, p_n$ of the convolutional layer of the convolutional layer 730, and (iii) the element bias parameter d are acquired. In addition, as explained above, the optimal values are used in the NCReLU_Conv operation unit through the Formulas 6 and 7.

If a process of learning each parameter has been completed by the learning device of FIG. 7, the loss layer 750 is removed and then testing is performed by a test device (not illustrated) without the loss layer 705. In other words, after passing a test image through said many convolutional layers, e.g., convolutional layers 710 and 730, and said many NCReLU, e.g., the NCReLU 720 and other NCReLUs (not illustrated), which are disposed alternately, the test device may allow an output (acquired by passing through said many convolutional layers and said many NCReLU) to be inputted to the application block 740 and then a result value outputted from the application block 704 may be acquired. For example, the application block 740 may be an object detection block or a semantic segmentation block but it is not limited to these.

Figure 8:
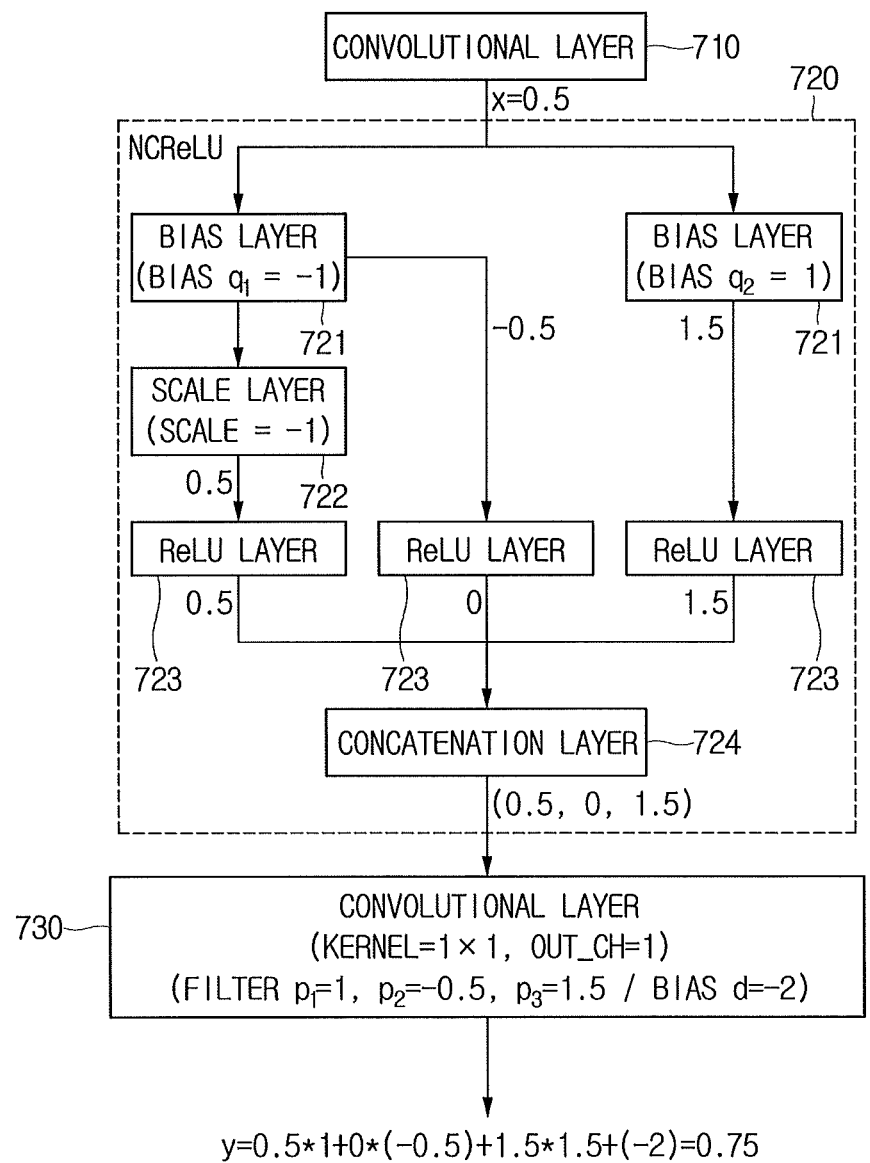
FIG. 8 represents an example of FIG. 7.

FIG. 8 represents an example of FIG. 7.

FIG. 8 shows an example of calculating an input value by using the element weight parameters $p_1, \ldots, p_n$ of the convolutional layer, the element bias parameter d thereof, and the element bias parameters $q_1, \ldots, q_{n-1}$ of the bias layers through the CNN model same to the learning device 700 in FIG. 7 instead of the Formula 6.

As shown in FIG. 6B, if an input value x which is 0.5 is delivered to the activation module 720 by the previous convolutional layer 710, a first bias layer of the activation module 720 delivers −0.5, acquired by applying a first bias parameter $q_1$ of −1, to both the scale layer 722 and a second bias layer of the activation module 720 delivers 1.5, acquired by applying a second bias parameter $q_2$ of 1, to a third ReLU layer.

Meanwhile, the learning device allows the scale layer 722 to receive a value of −0.5 from the first bias layer and then multiply −0.5 by −1 to thereby acquire a multiplication value of 0.5 which is then delivered to the first ReLU layer. As a result, the first to the third ReLU layers respectively receive 0.5, −0.5, and 1.5 and then output 0.5, 0, and 1.5, respectively by applying ReLU operations. The concatenation layer 724 concatenates the output of the first to the third ReLU layers and delivers the concatenated value to the next convolutional layer 730.

The convolutional layer outputs 0.75 as an output y which is 0.5*1+0*(−0.5)+1.5*1.5+(−2) by applying the element weight parameters 1, −0.5, and 1.5 and the element bias parameter −2 to the output of the first to the third ReLU layers. As such, it can be found through the learning device in FIG. 7 or the CNN model in a form similar to the learning device that 0.75 as the output value from the convolutional layer 730 is equal to the value outputted through the operation unit in FIG. 6B.

As those skilled in the art in the field of the present invention could be understood, the transmission and reception of the aforementioned images, e.g., image data such as input images, training images, and test images, may be made by the communication parts of the learning device and the testing device and feature maps and various data to be used for performing various operations may be kept and maintained by the processors (or memory) of the learning device and the testing device.

In accordance with the present invention, it is possible to perform the CReLU operation and the convolution operation at the same time through a new operation unit which requires less quantity of operations.

In addition, the present invention has an effect of implementing N-way CReLU operation and reducing the quantity of convolution operations, thereby increasing detection accuracy without drastic increase in the quantity of operations.

The objects of the technical solution of the present invention or parts contributing to the prior art can be implemented in a form of executable program command through a variety of computer means and can be recorded to computer readable recording media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a compiler but also a high-level code that can be used by an interpreter etc., which is executed by a computer. The aforementioned hardware devices can work as more than a software module to perform the action of the present invention and they can do the same in the opposite case. The hardware devices may be combined with memory such as ROM and RAM to store program commands and include a processor such as CPU or GPU composed to execute commands stored in the memory and also include a communication part for sending and receiving signals with external devices.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A method of learning parameters of a convolutional neural network ("CNN") in a computing device having a processor in which (i) activation operation of an activation module including multiple element bias layers, a scale layer, and multiple element activation layers and (ii) convolution operation of a convolutional layer are performed, comprising steps of:

(a) individual multiple element bias layers receiving an input value corresponding to the input image and then each of the individual multiple element bias layers applying its corresponding each element bias parameter qi to the input value;

(b) the scale layer connected to a specific element bias layer among the multiple element bias layers multiplying a predetermined scale value by an output value of the specific element bias layer;
(c) a specific element activation layer connected to the scale layer applying a nonlinear activation function to an output value of the scale layer, and (ii) the other individual element activation layers connected to the individual element bias layers applying individual nonlinear functions to output values of the individual element bias layers;
(d) a concatenation layer concatenating an output value of the specific element activation layer and output values of the other element activation layers, thereby acquiring a concatenated output;
(e) the convolutional layer applying the convolution operation to the concatenated output by using each element weight parameter pi of the convolutional layer and each element bias parameter d thereof;
(f) if the output of the step of (e) is inputted in an application block and then a result value outputted from the application block is acquired, a loss layer acquiring a loss calculated by comparing between the result value outputted from the application block and a value of Ground Truth ("GT") corresponding thereto, thereby adjusting at least some among each element bias parameter qi of the individual element bias layers, the element weight parameter pi, and the element bias parameter d during a backpropagation process; and
(g) acquiring and outputting to a storage device, the adjusted at least some among each element bias parameter qi of the individual element bias layers, the element weight parameter pi, and the element bias parameter d.

2. The learning method of claim 1, wherein the scale value is a minus value.

3. The learning method of claim 1, wherein the activation module includes N-way concatenated rectifier linear units ("CReLUs") and the element activation layers are Rectified Linear Units (ReLU) layers.

4. The learning method of claim 1, wherein, if n pieces of the element activation layers are used at the step of (c), n−1 pieces of the element bias layers are used at the step of (a).

5. A method of learning parameters of a convolutional neural network ("CNN") in a computing device having a processor in which (i) activation operation of an activation module including multiple element bias layers, a scale layer, and multiple element activation layers and (ii) convolution operation of a convolutional layer are performed, comprising steps of:
(a) individual multiple element bias layers receiving an input value corresponding to the input image and then each of the individual multiple element bias layers applying its corresponding each element bias parameter qi to the input value;
(b) the scale layer connected to a specific element bias layer among the multiple element bias layers multiplying a predetermined scale value by an output value of the specific element bias layer;
(c) a concatenation layer connected to the scale layer and the individual element bias layers concatenating an output value of the scale layer and output values of the individual element bias layers, thereby acquiring a concatenated output;
(d) an activation layer connected to the concatenation layer applying a nonlinear activation function to the concatenated output;
(e) the convolutional layer applying the convolution operation to the output value of the activation layer by using each element weight parameter $p_i$ of the convolutional layer and each element bias parameter d thereof;
(f) if the output of the step of (e) is inputted in an application block and then a result value outputted from the application block is acquired, a loss layer acquiring a loss calculated by comparing between the result value outputted from the application block and a value of Ground Truth ("GT") corresponding thereto, thereby adjusting at least some among each element bias parameter qi of the individual element bias layers, and the element weight parameter $p_i$, and the element bias parameter d during a backpropagation process; and
(g) acquiring and outputting to a storage device, the adjusted at least some among each element bias parameter qi of the individual element bias layers, the element weight parameter pi, and the element bias parameter d.

6. The learning method of claim 5, wherein the scale value is a minus value.

7. The learning method of claim 5, wherein the activation module includes N-way concatenated rectifier linear units ("CReLUs") and the activation layer is Rectified Linear Unit (ReLU) layer.

8. The learning method of claim 5, wherein n−1 pieces of the element bias layers are used at the step of (a).

9. A computing device for learning parameters of a convolutional neural network ("CNN") in which (i) activation operation of an activation module including multiple element bias layers, a scale layer, and multiple element activation layers and (ii) convolution operation of a convolutional layer are performed, comprising:
a storage device;
a communication part for receiving an input image; and
a processor for performing (i) a process of individual multiple element bias layers receiving an input value corresponding to the input image and then each of the individual multiple element bias layers applying its corresponding each element bias parameter qi to the input value, (ii) a process of the scale layer connected to a specific element bias layer among the multiple element bias layers multiplying a predetermined scale value by an output value of the specific element bias layer, (iii) processes of (iii-1) a specific element activation layer connected to the scale layer applying a nonlinear activation function to an output value of the scale layer, and (iii-2) the other individual element activation layers connected to the individual element bias layers applying individual nonlinear functions to output values of the individual element bias layers, (iv) a process of a concatenation layer concatenating an output value of the specific element activation layer and output values of the other element activation layers, thereby acquiring a concatenated output, (v) a process of the convolutional layer applying the convolution operation to the concatenated output by using each element weight parameter $p_i$ of the convolutional layer and each element bias parameter d thereof, (vi) a process of, if the output of the process of (v) is inputted in an application block and then a result value outputted from the application block is acquired, a loss layer acquiring a loss calculated by comparing between the result value outputted from the application block and a value of Ground Truth ("GT") corresponding thereto, thereby adjusting at least some among each element bias parameter $q_i$ of the individual element bias layers, the element weight parameter $p_i$, and the element bias parameter d during a backpropagation process, (vii) a process of acquiring and outputting to the storage device, the adjusted at least some among each element bias parameter qi of the individual element bias layers, the element weight parameter pi, and the element bias parameter d.

10. The computing device of claim 9, wherein the scale value is a minus value.

11. The computing device of claim 9, wherein the activation module includes N-way concatenated rectifier linear units ("CReLUs") and the element activation layers are Rectified Linear Units (ReLU) layers.

12. The computing device of claim 9, wherein, if n pieces of the element activation layers are used at the processes of (iii), n−1 pieces of the element bias layers are used at the process of (i).

13. A computing device for learning parameters of a convolutional neural network ("CNN") in which (i) activation operation of an activation module including multiple element bias layers, a scale layer, and multiple element activation layers and (ii) convolution operation of a convolutional layer are performed, comprising:
a storage device;
a communication part for receiving an input image; and
a processor for performing (i) a process of individual multiple element bias layers receiving an input value corresponding to the input image and then each of the individual multiple element bias layers applying its corresponding each element bias parameter qi to the input value, (ii) a process of the scale layer connected to a specific element bias layer among the multiple element bias layers multiplying a predetermined scale value by an output value of the specific element bias layer, (iii) a process of a concatenation layer connected to the scale layer and the individual element bias layers concatenating an output value of the scale layer and output values of the individual element bias layers, thereby acquiring a concatenated output, (iv) a process of an activation layer connected to the concatenation layer applying a nonlinear activation function to the concatenated output, (v) a process of the convolutional layer applying the convolution operation to the output value of the activation layer by using each element weight parameter $p_i$ of the convolutional layer and each element bias parameter d thereof, (vi) a process of, if the output of the process of (v) is inputted in an application block and then a result value outputted from the application block is acquired, a loss layer acquiring a loss calculated by comparing between the result value outputted from the application block and a value of Ground Truth ("GT") corresponding thereto, thereby adjusting at least some among each element bias parameter qi of the individual element bias layers, and the element weight parameter $p_i$, and the element bias parameter d during a backpropagation process, and (vii) a process of acquiring and outputting to the storage device, the adjusted at least some among each element bias parameter qi of the individual element bias layers, the element weight parameter pi, and the element bias parameter d.

14. The computing device of claim 13, wherein the scale value is a minus value.

15. The computing device of claim 13, wherein the activation module includes N-way concatenated rectifier linear units ("CReLUs") and the activation layer is Rectified Linear Unit (ReLU) layer.

16. The computing device of claim 13, wherein n−1 pieces of the element bias layers are used at the process of (i).

* * * * *